UNITED STATES PATENT OFFICE.

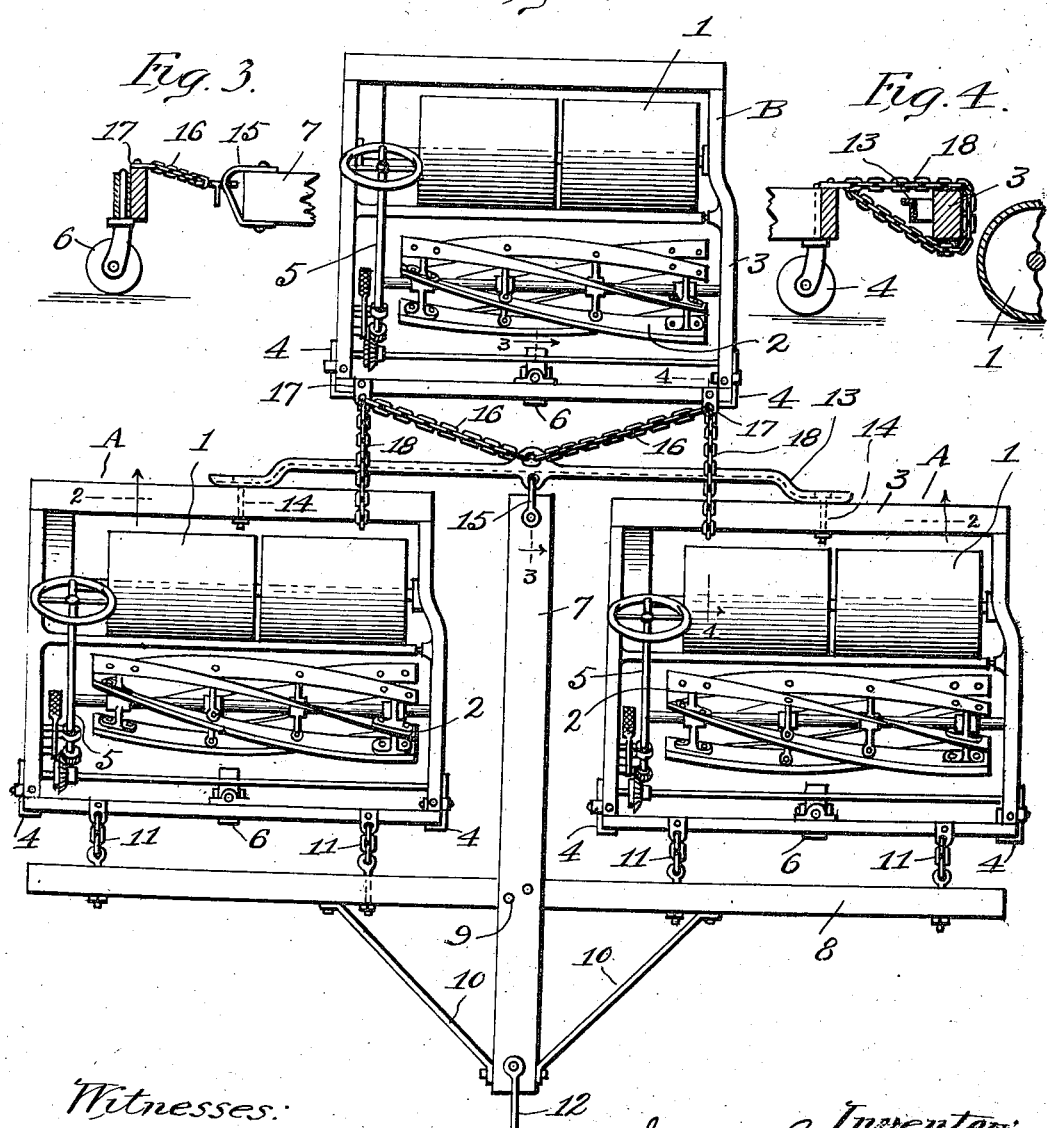

JOSEPH A. ROSEMAN, OF GLENVIEW, ILLINOIS.

GRASS-MOWING MACHINE.

1,327,924.  Specification of Letters Patent.  Patented Jan. 13, 1920.

Application filed July 8, 1918. Serial No. 243,773.

*To all whom it may concern:*

Be it known that I, JOSEPH A. ROSEMAN, a citizen of the United States, residing at Glenview, in the county of Cook and State of Illinois, have invented new and useful Improvements in Grass-Mowing Machines, of which the following is a full, clear, concise, and exact description, reference being had to the accompanying drawing, forming a part of this specification.

My invention relates to grass-mowing machines and more particularly to that type which includes a plurality of mowers arranged to cut a relatively wide swath, it being especially desired that the various parts shall be designed in a substantially commercially practical manner to permit them to automatically and independently adjust themselves to the inequalities of the surface of the ground.

Another object is to produce a machine having a frame or support surrounding it which is adapted to provide means for mounting the working parts of the mower and also to act as a guard to prevent objects from coming into contact with the working parts of the machine.

Another object is to provide means for connecting the several mowers together so that they will adapt themselves to undulating ground.

These and other objects of advantage are secured as hereinafter set forth, reference being had to the accompanying drawing, in which—

Figure 1 is a plan view;

Fig. 2 is a detail sectional view taken on the line 2—2 of Fig. 1;

Fig. 3 is a fragmentary sectional view taken on the line 3—3 of Fig. 1; and

Fig. 4 is a fragmentary sectional view taken on the line 4—4 of Fig. 1.

The device consists of two front mowers A, A and a rear mower B. The three mower sections being similar in construction, a detail description of one will suffice. Each mower comprises the usual roller 1 revolubly mounted and the usual revolving cutters 2, these parts being operatively mounted in a rectangular frame 3 which frame surrounds the operating parts and provides a bearing for them. Mounted in the forward corners of the frame are wheels 4 which may be adjustable so as to regulate the distance the cutting elements are from the ground and hence control the length of the grass cut. These wheels may be adjusted in any suitable manner, and, as this forms no part of the present invention, I have merely indicated such adjusting means by the numeral 5. A wheel 6 may be provided centrally of the forward part of the frame, and may be made adjustable if desired.

I will now describe the means for operatively connecting the three mower sections together. A tongue 7 extends rearwardly between the two front mowers A, A and near its forward end carries a cross-bar 8 rigidly secured thereto as at 9 and extending to a point substantially opposite the outer sides of the front mower section. Braces 10, 10 assist in rigidly mounting said crossbeam to the tongue 7. The mower sections are secured by flexible draft connections 11 to the cross-beam 8. I have here shown this connection in the form of chains secured by eye-bolts to the beam 8, but it will be understood that any sort of flexible connection may be used. The front end of the tongue 7 carries a clevis 12. Secured centrally to the rear side of the frame of the mower sections A, A is a connecting member 13, said connecting member being pivotally secured to the frame by means of a bolt 14. A clevis 15 pivotally connects the rear end of the tongue 7 to the central part of the connecting member, thereby maintaining the tongue in spaced relation to the two mower sections.

To flexibly secure the rear mower section B to the tongue 7 and the front mower sections A, A, I provide flexible connections 16, 16 which are secured to clips 17, 17 on the forward side of the mower section B, the other ends of these chains being fastened to the connecting member 13 centrally thereof and at a point adjacent the clevis 15. Other chains or flexible connections 18, 18 pass around the rear side of the frame of the mower sections A, A and are also secured in the clips 17, 17.

From the foregoing, it will be seen that I have provided means whereby the several mower sections may be independently adjusted for use on undulating ground, at the same time providing means for distributing the pull equally to all sections. As shown in Fig. 2, the connecting member 13 secured centrally at the rear side of the mower sections A, A permits these sections to rock on their pivots 14, this being possible because of the flexible connections 11 at the forward sides of the sections A. The tongue 7 extends rearwardly between the mower sections A and through the connecting member 14 and applies a portion of the pulling power to the rear side of these mower sections, the rest of the pulling being applied at two points on the forward side of the frame. The manner in which the rear mower section B is secured to the tongue 7 and also to the mower sections A, A insures an even draft upon the same and also allows this section to adapt itself to the inequalities of the ground. It should be noted also that the tongue 7, having a pivotal connection with the member 13, provides for turning the mower as a whole. This connection when turning will assume a practically rigid connection with the mower sections to swing the same to one side or the other and the rear section B will, because of its connection to the connecting member and the mower sections A, A, follow these front sections as they swing to one side or the other in turning.

The frame of each mower section acts not only as a bearing for the working parts, but as a guard to prevent, for instance, the cross-beam 8 or any other object from coming into contact with the working parts, as this frame extends substantially centrally around the working parts and thereby acts as a guard for the same.

The nature and scope of the invention having been thus indicated and its preferred embodiment having been specifically described, what is claimed as new is:

1. A mowing machine composed of several units, each unit having a cutting element, a heavy roller in the rear of said cutting element holding said element securely on the ground, a frame surrounding said roller and cutting element, and means for flexibly securing said frames to one another.

2. A mowing machine composed of three units, each unit having a cutting element, a heavy roller in the rear of said cutting element holding said element securely on the ground, and a frame surrounding said roller and cutting element, a tongue extending rearwardly between the two forward units and having a cross-beam secured near its forward end, flexible connections between said cross-beam and two of the units, a connecting member connecting the rear end of the tongue and the said units, and a flexible connection between said connecting member and the other unit.

In witness whereof, I have hereunto subscribed my name.

JOSEPH A. ROSEMAN.

Witnesses:
JAMES T. SMITH, Jr.,
ARTHUR C. GRIMES.